United States Patent
Müller et al.

[11] Patent Number: 5,860,675
[45] Date of Patent: Jan. 19, 1999

[54] ADJUSTER DEVICE FOR A DEFLECTOR FITTING

[75] Inventors: Albrecht Müller, Durlangen; Volker Holzapfel, St. Wendel, both of Germany

[73] Assignee: TRW Occupant Rsteraint Systems GmbH, Alfdorf, Germany

[21] Appl. No.: 848,071

[22] Filed: May 1, 1997

[30] Foreign Application Priority Data

May 3, 1996 [DE] Germany ..................... 296 08 035 U

[51] Int. Cl.[6] .................................................. B60R 22/20
[52] U.S. Cl. ................................. 280/801.2; 297/480
[58] Field of Search .............................. 280/801.2, 808, 280/804, 806; 297/480, 483

[56] References Cited

U.S. PATENT DOCUMENTS

| | | | |
|---|---|---|---|
| 4,846,498 | 7/1989 | Fohl | 280/801.2 |
| 5,102,166 | 4/1992 | Bogner | 280/801.2 |
| 5,628,529 | 5/1997 | Golz et al. | 280/801.2 |

FOREIGN PATENT DOCUMENTS

| | | | |
|---|---|---|---|
| 3802323 | 8/1989 | Germany | 280/801.2 |

Primary Examiner—Paul N. Dickson
Attorney, Agent, or Firm—Rarolli, Sundheim, Covell, Tummino & Szabo

[57] ABSTRACT

An adjuster device for a deflector fitting of a vehicle occupant restraint system is provided, which comprises a rail adapted for vehicle-fixed mounting. The rail is provided with latching openings and comprises a bottom part and two side parts. The adjuster device further comprises a sled shiftable in the rail and adapted for being coupled to a vehicle seat. The sled is provided with a fitting part for the deflector fitting and at least one latching part which is able to cooperate with the latching openings to block the sled against a downwards displacement in the rail. The latching part is translatable from a normal rest position, in which it does not engage a latching opening, into a locking position in which it engages at least one of the latching openings, by means of a force acting downwards on the fitting part relative to the rail.

10 Claims, 5 Drawing Sheets

ADJUSTER DEVICE FOR A DEFLECTOR FITTING

TECHNICAL FIELD

The invention relates to an adjuster device for a deflector fitting of a vehicle occupant restraint system.

BACKGROUND OF THE INVENTION

A typical adjuster device for a deflector fitting of a vehicle occupant restraint system comprises a vehicle-fixed rail provided with latching openings and having a bottom part and two side parts, and a sled shiftable in the rail and coupled to a vehicle seat. The sled is provided with a fitting part for the deflector fitting and at least one latching part which is able to cooperate with the latching openings to block the sled against a downwards displacement in the rail relative to the vehicle.

By means of such an adjuster device the run of the seat belt may be optimally adapted to the stature of the vehicle occupant in each case, this adaptation being achieved via the fore and aft adjustment of the vehicle seat. The problem posed with such an adjuster device is that whilst, on the one hand, smooth adjustment of the sled upon fore and aft adjustment of the vehicle seat needs to be assured, on the other, the sled must be reliably blocked on the rail in any position when via the seat belt a force is exerted on the deflector fitting oriented downwards relative to the vehicle as is the case in an accident. This problem is aggravated when the vehicle occupant restraint system is provided with a belt tensioner which eliminates belt slack from the system in case of an accident. The forces thereby exerted on the deflector fitting may result in the latching part no longer reliably engaging the next available latching opening and thus the sled is displaced downwards relative to the vehicle, as a result of which the effect of the belt tensioner is impaired.

BRIEF SUMMARY OF THE INVENTION

The invention provides an adjuster device which on the one hand permits smooth adjustment of the sled relative to the rail when the vehicle seat is shifted and, on the other, ensures in an emergency situation fast and reliable blocking of the sled on the rail.

According to the invention, an adjuster device for a deflector fitting of a vehicle occupant restraint system is provided, which comprises a rail adapted for vehicle-fixed mounting. The rail is provided with latching openings and comprises a bottom part and two side parts. The adjuster device further comprises a sled shiftable in the rail and adapted for being coupled to a vehicle seat. The sled is provided with a fitting part for the deflector fitting and at least one latching part which is able to cooperate with the latching openings to block the sled against a downwards displacement in the rail. The latching part is translatable from a normal rest position, in which it does not engage a latching opening, into a locking position in which it engages at least one of the latching openings, by means of a force acting downwards on the fitting part relative to the rail. This arrangement assures a particularly safe and speedy locking of the sled which also permits use of a belt tensioner in the occupant restraint system. The latching part latches in one of the latching openings only in case of an emergency, this being the reason why the sled is smoothly adjustable in the rail at all times under normal conditions.

In accordance with a first embodiment of the invention it is provided that the latching part is configured as a latching plate provided with a latching edge, which is shiftably arranged on the sled and is elastically biased into the rest position. It is further provided that the sled comprises a guide surface onto which the latching plate runs when the fitting part is subjected to a force acting downwards, and from which it is guided towards the part of the rail in which the latching openings are arranged. Due to the translation of the force acting on the deflector fitting in an emergency situation by means of the guide surface a particularly high force for positively engaging the latching edge into the latching openings is achieved.

In accordance with a second embodiment of the invention it is provided that the latching part is configured as a latching plate provided with a latching projection. The laching plate is swivable from the rest position into the locking position about a tilt edge oriented perpendicular to the side parts. The fitting part is a fastener stud provided on the latching plate and arranged substantially perpendicular to a plane defined by the bottom part of the rail. The latching openings are arranged in the bottom part of the rail. Since simply a tilt movement is necessary to translate the latching plate from the normal rest position into the locked position, the latching projection is positively engaged into the latching openings particularly quickly in this configuration of the latching projection.

In accordance with a third embodiment of the invention it is provided that the latching plate is shiftable with respect to the sled as well as swivable about a tilt edge relative to the sled. This combines a particularly fast response of the latching plate to the forces acting on the occupant restraining system by producing a particularly high force for positively engaging the latching plate into the latching openings.

Advantageous embodiments of the invention are recited in the sub-claims.

BRIEF DESCRIPTION OF THE DRAWINGS

The invention will now be described with reference to various embodiments illustrated in the drawing in which.

DETAILED DESCRIPTION OF THE INVENTION

Figure 1:
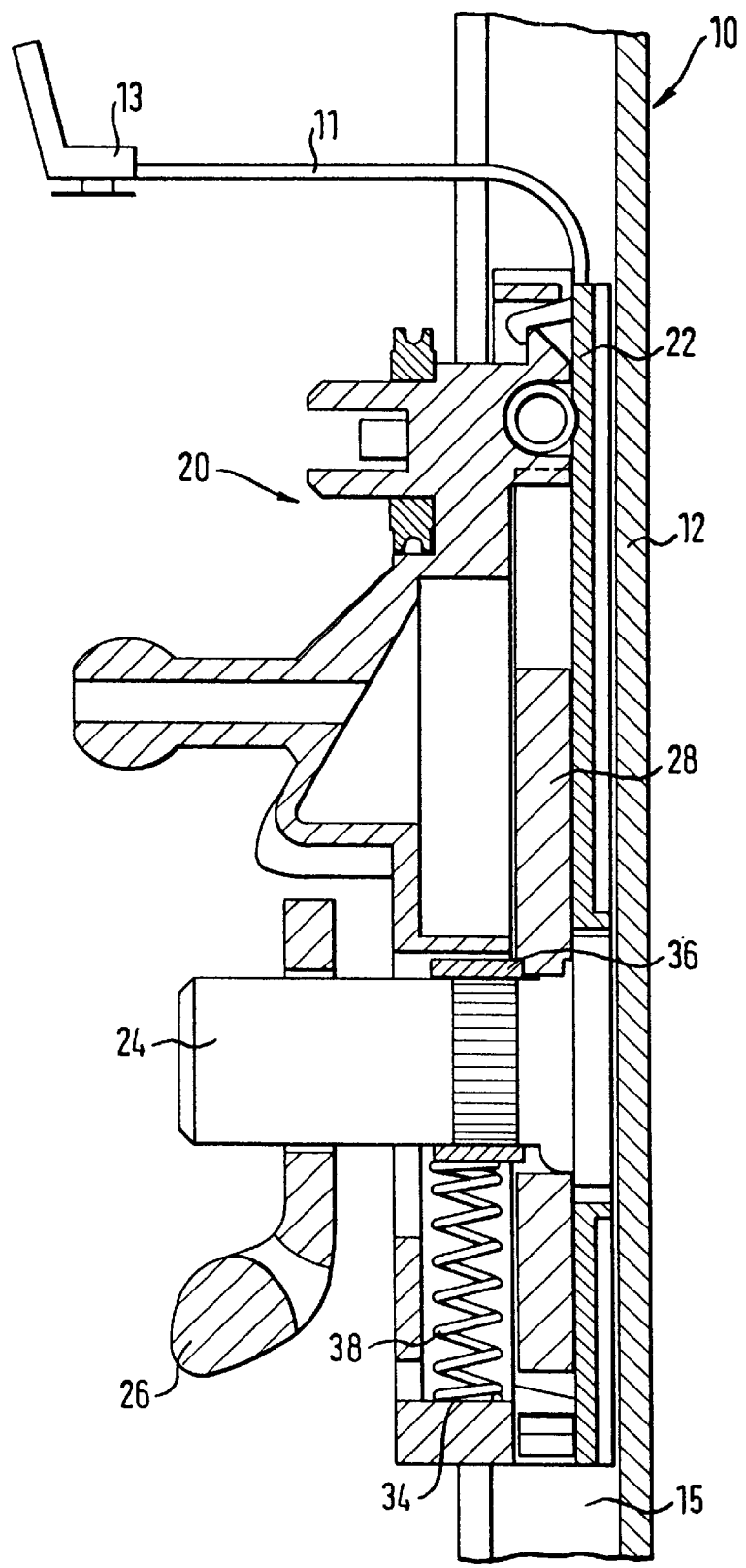
FIG. 1 is a schematic cross-section through an adjuster device in accordance with a first embodiment of the invention.
Figure 2:
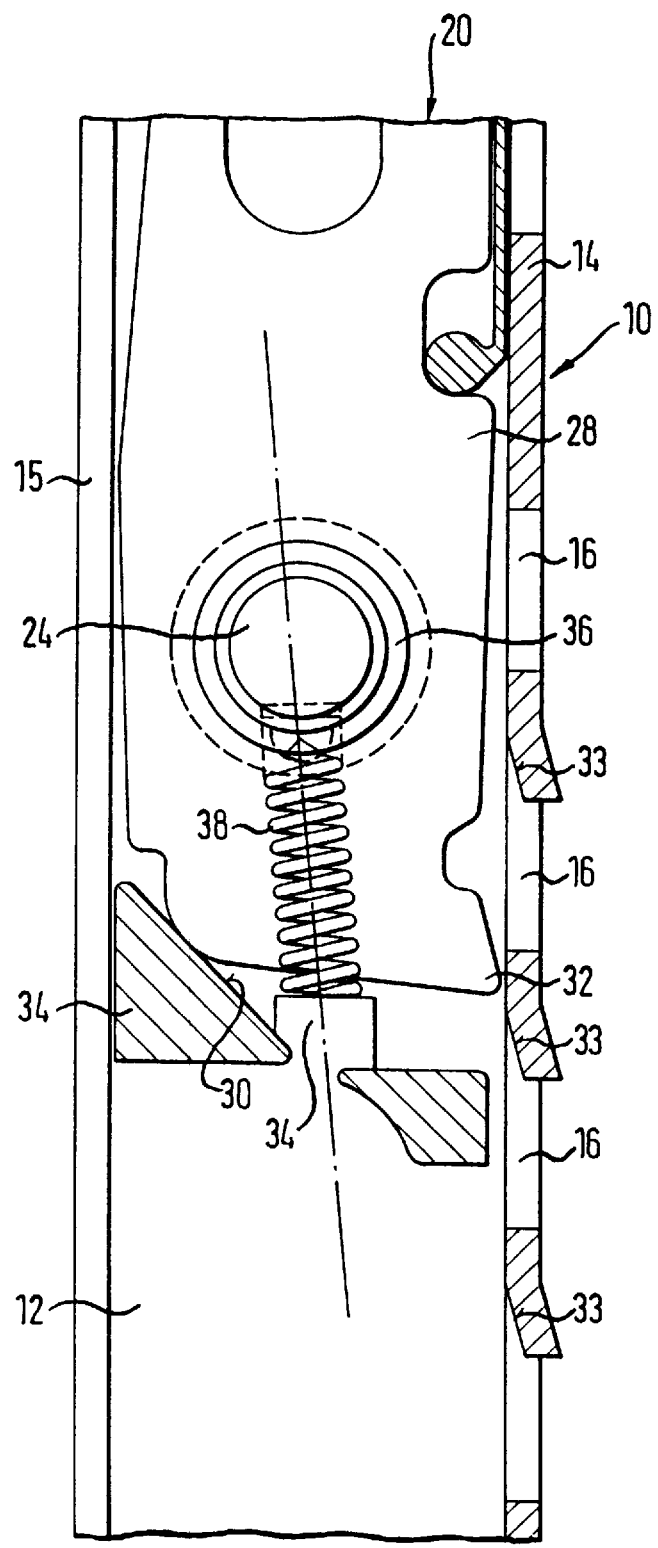
FIG. 2 is a partly sectioned schematic plan view of the adjuster device of FIG. 1.

In FIGS. 1 and 2 an adjuster device in accordance with a first embodiment of the invention is illustrated. The adjuster device includes a rail 10 fixed securely to the vehicle and containing a bottom part 12 and two side parts 14, 15. Latching openings 16 are arranged in the side part 14. In the rail 10 a sled 20 is shiftably arranged, substantially comprising a slipper 22, a fitting part configured as fastener stud 24 for a deflector fitting 26 and latching plate 28. The sled 20 is coupled to the vehicle seat 13 by means of a Bowden cable 11. The latching plate 28 is arranged shiftably with respect to the slipper 22, and on the slipper 22 a guide surface 30 is provided which is able to cooperate with the latching plate 28. At its lower edge, as viewed relative to the vehicle, on the side facing the latching openings 16, the latching plate is provided with a latching edge 32. A compression spring 38 is arranged between an abutment 34 on the slipper 22 and a sleeve 36 pushed on the fastener stud 24. The effective direction of the compression spring 38 is oriented inclined to the longitudinal axis of the rail such that the latching plate 28 is biased upwards relative to the vehicle into its rest position in which the latching edge 32 of the latching plate 28 is spaced from the latching openings 16. This position is illustrated in the FIGS. 1 and 2.

Due to a force being exterted on the deflector fitting 26 downwards relative to the vehicle which is greater than the force of the compression spring 38, the latching plate 28 can be shifted downwards relative to the slipper 22, the former running on the guide surface 30. This guide surface guides the latching plate 28 in the direction toward the side part 14 so that the latching edge 32 engages in the facing latching opening 16 thereby blocking the sled 20 on the rail 10. The latching openings 16 are provided with bevelled edges 33 so that even if the latching edge 32 in translation of the latching plate 28 into the locking position encounters a ridge of the rail 10 located between two adjacent latching openings 16, it reliably engages the next latching opening 16 on subsequent movement of the sled 20 downwards.

The counterforce to the force necessary for translating the latching plate 28 from the rest position into the locking position is furnished by means of the coupling of the sled 20 to the vehicle seat. When the occupant restraint system is provided with a belt tensioner, the action for blocking the sled 20 in the rail sequences so fast that part of the counterforce is furnished by the mass inertia of the sled 20.

Figure 3:
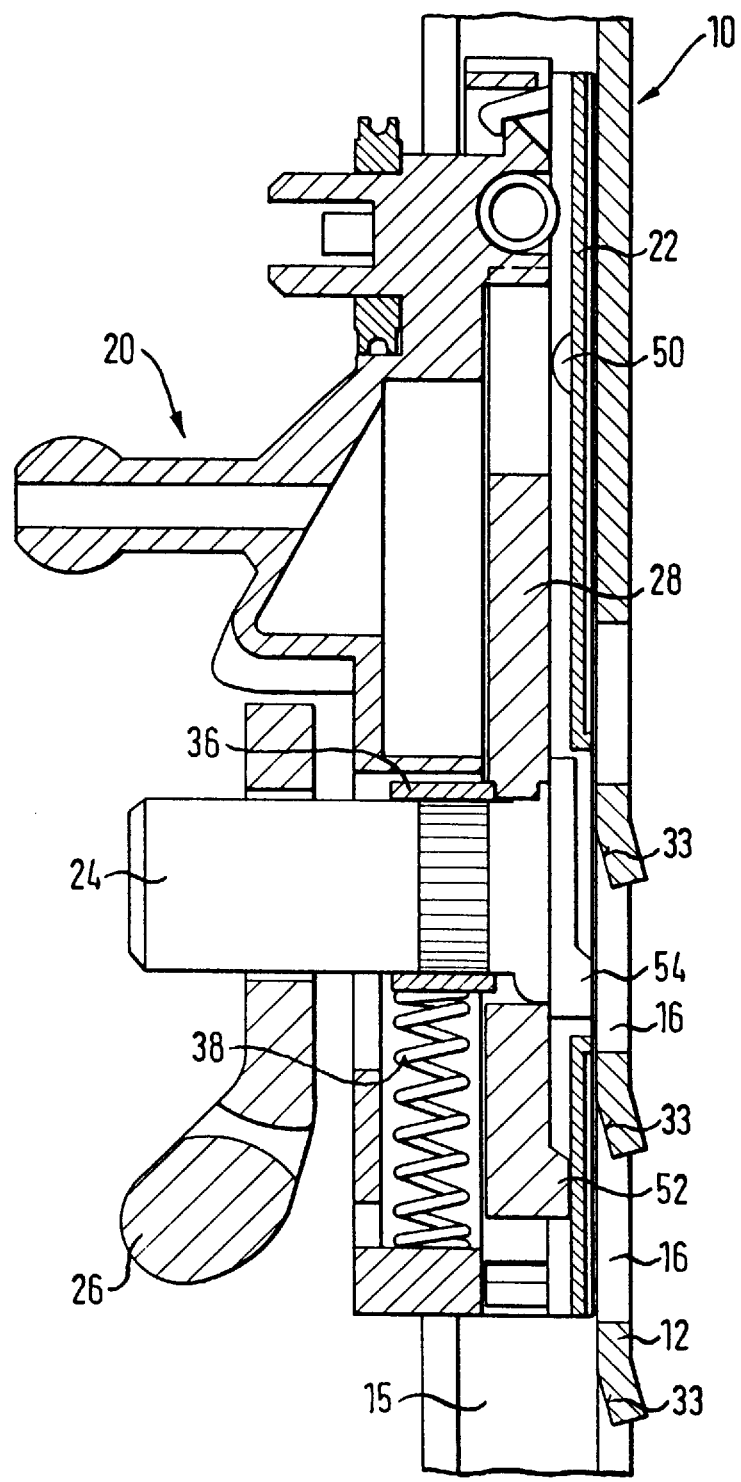
FIG. 3 is a schematic cross-section through an adjuster device in accordance with a second embodiment of the invention.

In FIG. 3 an adjuster device in accordance with a second embodiment of the invention is illustrated. Elements in the second embodiment which are known from the first embodiment are identified by like reference numerals as in FIGS. 1 and 2 and as regards their functioning reference is made to the explanations regarding these Figs.

In the second embodiment the latching plate 28 is arranged on the slipper 22 so that the former is able to execute a swivelling movement about a projection 50 formed on the slipper 22. Due to coaction of latching plate 28 and projection 50 a tilt edge is defined which is oriented perpendicularly to the side parts 14, 15 of the rail. In this embodiment the latching openings 16 are arranged in the bottom part 12 of the rail and the latching plate 28 is provided at its lower end on the side facing the bottom part 12 with a latching projection 52. In addition, the end of the fastener stud 24 facing the bottom part 12 includes a latching nose 54. The compression spring 38 is arranged so that it produces a moment about the tilt edge biasing the latching plate 28 and the fastener stud 24 into the rest position illustrated in FIG. 3.

When a force oriented downwards relative to the vehicle is exerted on the deflector fitting 26 the latching plate 28 executes together with the fastener stud 24 a swivel movement about the tilt edge which with respect to the illustration shown in FIG. 3 occurs counter-clockwise. As a result of this swivel movement the latching plate 28 and the fastener stud 24 are moved from their rest position into the locking position in which the latching projection 52 and the latching nose 54 are able to engage the latching openings 16. In this arrangement the distance of the latching projection 52 from the latching nose 54 is selected relative to the spacing of the latching openings 16 so that in every position of the sled 20 relative to the rail 10 either the latching projection 52 or the latching nose 54 is able to directly engage a latching opening 16. The sled 20 is thus blocked in every position relative to the rail within a very short travel, so that the tensioning effect of any belt tensioner employed is not impaired.

Figure 4:
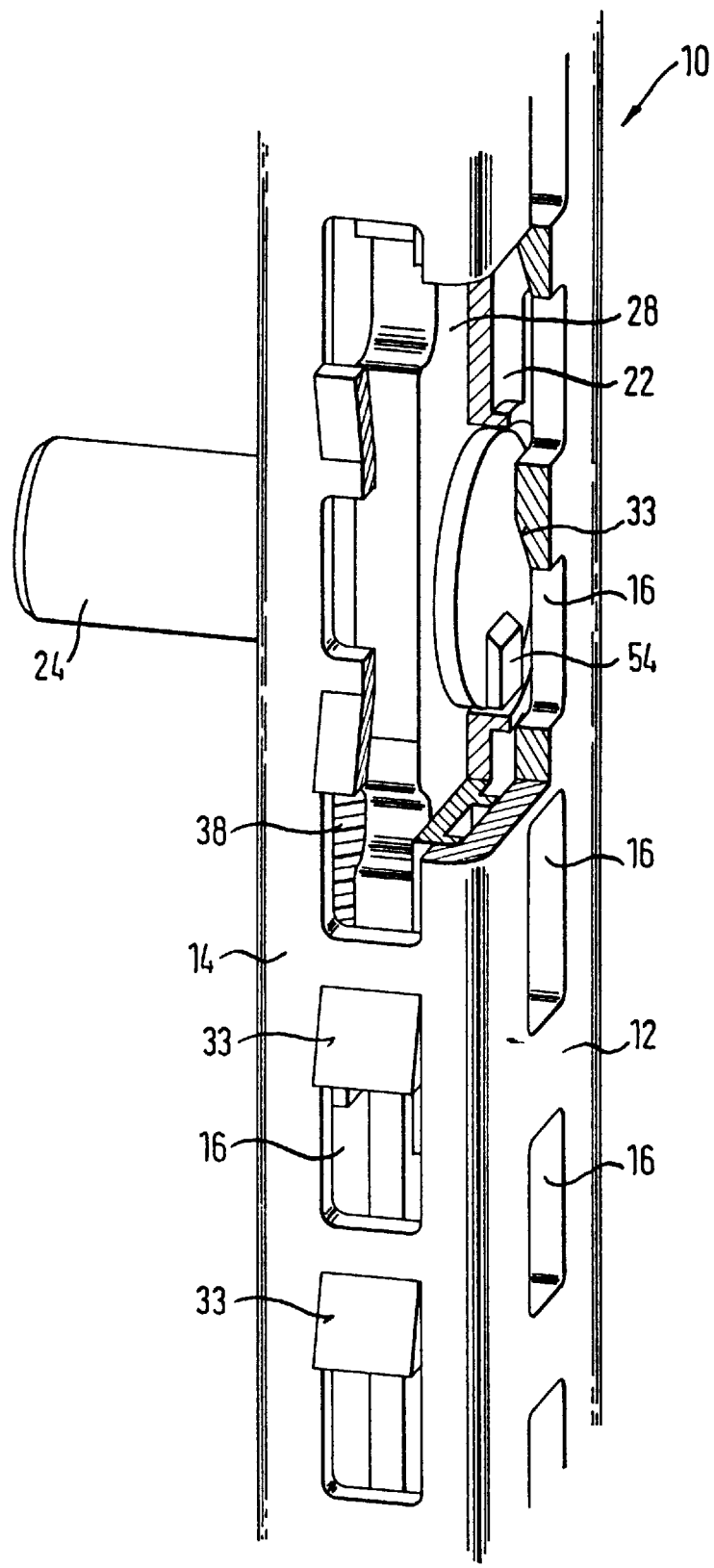
FIG. 4 is a perspective view including partial cutouts of an adjuster device in accordance with a third embodiment of the invention.
Figure 5:
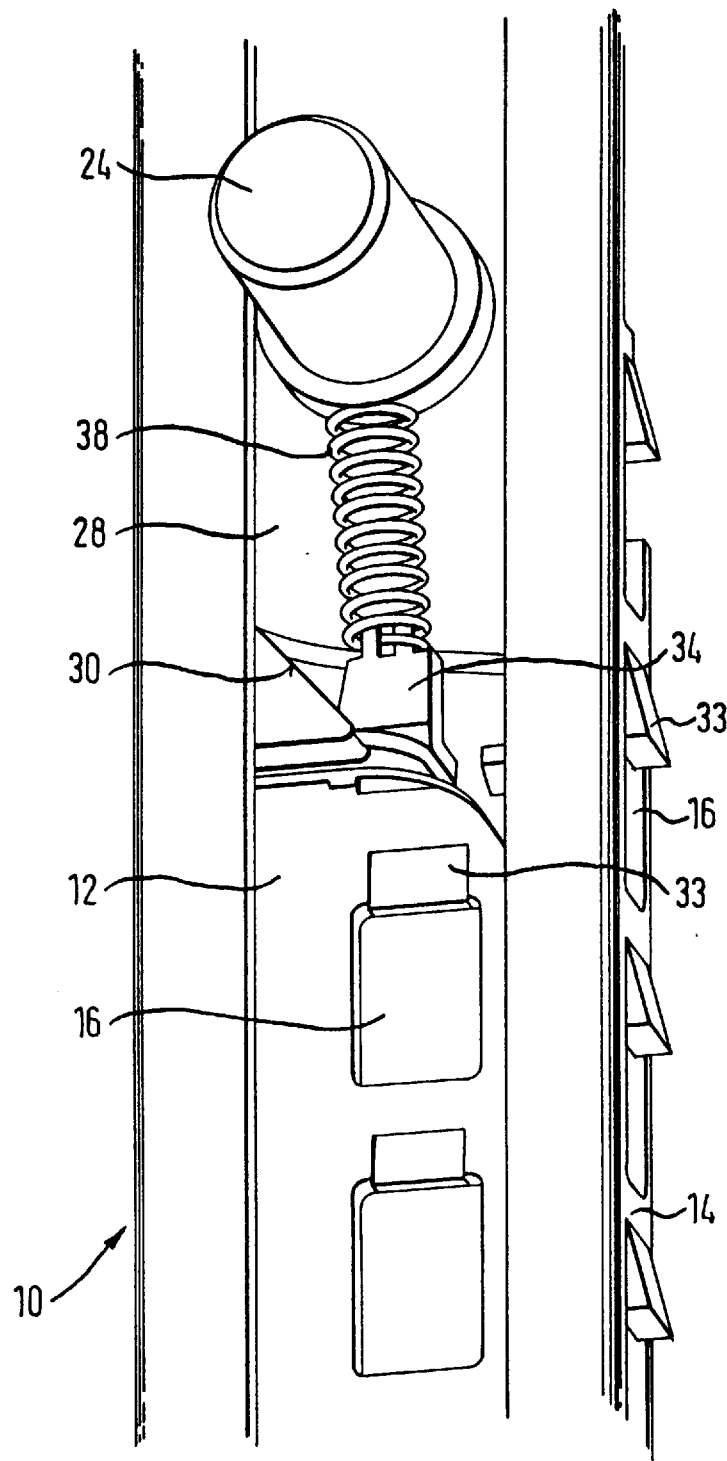
FIG. 5 is a further perspective view of the adjuster device of FIG. 5.

In the FIGS. 4 and 5 an adjuster device in accordance with a third embodiment of the invention is illustrated. Here too in this embodiment known elements are identified by reference numerals used in FIGS. 1 to 3, reference being made to the explanations of these Figs. as regards their functioning.

The adjuster device in accordance with the third embodiment combines the locking principles of the first embodiment and second embodiment. The rail 10 is provided with latching openings 16 on both the side part 14 and on the bottom part 12, and the latching plate 28 is provided with both a latching edge 32 and a latching projection 52. Furthermore, the fastener stud 24 is provided with a latching nose 54. The compression spring 38 impacts the latching plate 28 upwards relative to the sled 20 into the rest position in which the latching edge 32 is spaced from the latching openings 16 in the side part 14 of the rail, the compression spring 38 furthermore producing a moment about the tilt edge which maintains the latching projection 52 and the latching nose 54 spaced from the latching openings 16 arranged in the bottom part 12.

When, starting from the rest position illustrated in FIGS. 4 and 5, a force oriented downwards relative to the vehicle is exterted on the deflector fitting 26, the latching plate 28 together with the fastener stud 24 executes a combined pushing and swivelling movement into the latching position, whereby, for one thing, due to the latching plate 28 running onto the guide surface 30 the latching edge 32 is guided in the direction of the latching openings 16 arranged in the side part 14 and, for another, the latching projection 52 and the latching nose 54 are moved by a swivel movement of the latching plate 28 about the tilt edge in the direction of the latching openings 16 arranged in the bottom part 12. The distance between each of the latching edge 32, the latching projection 52 and the latching nose 54 differs from the spacing of the latching openings 16 such that in every position of the sled 20 relative to the rail 10 one of the latching elements 32, 52, 54 is always able to directly engage one of the latching openings 16 when the latching plate 28 is translated from its rest position into its latching position. In this way the idle travel, which the sled 20 is able to execute as a maximum following translation of the latching plate 28 into the latching position relative to the rail 10 until reliably blocked, is minimized.

All three embodiments of the invention offer the advantage of the sled 20 being freely movable in the rail 10 under normal operation conditions so that an adjustment of the vehicle seat 13 and thus adapting the deflector fitting 26 to the stature of the vehicle occupant in each case is possible by particularly simple and conventient means. Should, by contrast, blocking the sled 20 on the rail be needed, this is done reliably with fast response and minimum idle travel, since translating the latching plate 28 from the rest position into the locking position follows directly by means of the fastener stud 24 to which the deflector fitting 26 for the seat belt is attached. In the second and third embodiment it is assured that in every position of the sled 20 at least one of the latching elements effecting blocking of the sled 20 reliably engages one of the latching openings 16. In the third embodiment it is assured by the use of three latching elements in a suitable distance from each other that blocking the sled 20 on the rail 10 occurs after an extremely short idle travel.

We claim:

1. An adjuster device for a deflector fitting of a vehicle occupant restraint system, comprising a rail adapted for vehicle-fixed mounting, said rail being provided with latching openings and having a bottom part and two side parts, and a sled shiftable in said rail and adapted for being coupled to a vehicle seat, said sled being provided with a fitting part for said deflector fitting and at least one latching part which is able to cooperate with said latching openings to block said sled against a downwards displacement in said rail, said latching part being translatable from a normal rest position, in which it does not engage a latching opening, into a locking position in which it engages at least one of said latching openings, by means of a force acting downwards on said fitting part relative to said rail, said latching part being configured as a latching plate provided with a latching edge, which is shiftably arranged on said sled and is elastically biased into said rest position, said sled comprising a guide surface onto which said latching plate runs when said fitting part is subjected to a force acting downwards, and from which it is guided towards the part of the rail in which said latching openings are arranged.

2. The adjuster device of claim 1, wherein said latching plate extends parallel to said bottom part of said rail and said latching openings are arranged in one of said side parts of said rail.

3. An adjuster device for a deflector fitting of a vehicle occupant restraint system, comprising a rail adapted for vehicle-fixed mounting, said rail being provided with latching openings and having a bottom part and two side parts, and a sled shiftable in said rail and adapted for being coupled to a vehicle seat, said sled being provided with a fitting part for said deflector fitting and at least one latching part which is able to cooperate with said latching openings to block said sled against a downwards displacement in said rail, said latching part being translatable from a normal rest position, in which it does not engage a latching opening, into a locking position in which it engages at least one of said latching openings, by means of a force acting downwards on said fitting part relative to said rail, said latching part being configured as a latching plate provided with a latching edge, which is shiftably arranged on said sled and is elastically biased into said rest position, said sled comprising a guide surface onto which said latching plate runs when said fitting part is subjected to a force acting downwards, and from which it is guided towards the part of the rail in which said latching openings are arranged, a spring being provided which biases said latching plate into said rest position, said spring being supported by said sled and by said fitting part, said spring being oriented with its effective direction inclined to a longitudinal axis of said rail such that said latching edge is biased away from said latching openings.

4. An adjuster device for a deflector fitting of a vehicle occupant restraint system, comprising a rail adapted for vehicle-fixed mounting, said rail being provided with latching openings and having a bottom part and two side parts, and a sled shiftable in said rail and adapted for being coupled to a vehicle seat, said sled being provided with a fitting part for said deflector fitting and at least one latching part which is able to cooperate with said latching openings to block said sled against a downwards displacement in said rail, said latching part being translatable from a normal rest position, in which it does not engage a latching opening, into a locking position in which it engages at least one of said latching openings, by means of a force acting downwards on said fitting part relative to said rail, said latching part being configured as a latching plate provided with a latching projection, said latching plate being swivable from said rest position into said locking position about a tilt edge oriented perpendicular to said side parts, said fitting part being a fastener stud provided on said latching plate and arranged substantially perpendicular to a plane defined by said bottom part of said rail, said latching openings being arranged in said bottom part of said rail, said tilt edge being defined by a projection provided on said sled, said latching plate resting against said projection, a spring being provided which is supported by said sled and by said fastener stud, said spring producing a moment about said tilt edge biasing said latching plate into the rest position.

5. An adjuster device for a deflector fitting of a vehicle occupant restraint system, comprising a rail adapted for vehicle-fixed mounting, said rail being provided with latching openings and having a bottom part and two side parts, and a sled shiftable in said rail and adapted for being coupled to a vehicle seat, said sled being provided with a fitting part for said deflector fitting and at least one latching part which is able to cooperate with said latching openings to block said sled against a downwards displacement in said rail, said latching part being translatable from a normal rest position, in which it does not engage a latching opening, into a locking position in which it engages at least one of said latching openings, by means of a force acting downwards on said fitting part relative to said rail, said latching part being configured as a latching plate provided with a latching projection, said latching plate being swivable from said rest position into said locking position about a tilt edge oriented perpendicular to said side parts, said fitting part being a fastener stud provided on said latching plate and arranged substantially perpendicular to a plane defined by said bottom part of said rail, said latching openings being arranged in said bottom part of said rail, said fastener stud comprising an axial end facing the bottom part, said axial end being provided with a latching nose which on swiveling of said latching plate about said tilt edge into said locking position is engageable in one of said latching openings.

6. The adjuster device of claim 5, wherein the distance between said latching nose on said fastener stud and said latching projection on said latching plate differs from the spacing of said latching openings such that in every position of said sled relative to said rail either said latching nose or said latching projection is engagable in one of said latching openings.

7. An adjuster device for a deflector fitting of a vehicle occupant restraint system, comprising a rail adapted for vehicle-fixed mounting, said rail being provided with latching openings and having a bottom part and two side parts, and a sled shiftable in said rail and adapted for being coupled to a vehicle seat, said sled being provided with a fitting part for said deflector fitting and at least one latching part which is able to cooperate with said latching openings to block said sled against a downwards displacement in said rail, said latching part being translatable from a normal rest position, in which it does not engage a latching opening, into a locking position in which it engages at least one of said latching openings, by means of a force acting downwards on said fitting part relative to said rail, said latching part being configured as a latching plate provided with a latching edge, which is shiftably arranged on said sled and is elastically biased into said rest position, said sled comprising a guide surface onto which said latching plate runs when said fitting part is subjected to a force acting downwards, and from which it is guided towards the part of the rail in which said latching openings are arranged, said latching plate extending parallel to said bottom part of said rail, said latching openings being arranged in one of said side parts of said rail, said bottom part being provided with latching openings, a projection being arranged on said sled on which said latching plate rests, so that a tilt edge extending perpendicularly to said side parts is formed for said latching plate, said latching plate being provided with a latching projection, said fitting part being a fastener stud fixed to said latching plate and having an axial end being provided with a latching nose, said latching plate together with said fastener stud being movable by a combined pushing and swiveling movement from said rest position into said locking position.

8. The adjuster device of claim 7, wherein the distance between each of said latching edge, said latching nose and said latching projection differs from the spacing of said latching openings such that in every position of said sled relative to said rail at least one of said latching elements is engagable directly in one of said latching openings.

9. An adjuster device for a deflector fitting of a vehicle occupant restraint system, comprising a rail adapted for vehicle-fixed mounting, said rail being provided with latching openings and having a planar bottom part and two side parts, and a sled shiftable in said rail and adapted for being coupled to a vehicle seat, said sled being provided with a fitting part for said deflector fitting and at least one latching part which is able to cooperate with said latching openings to block said sled against a downwards displacement in said rail, said latching part being translatable from a normal rest position, in which it does not engage a latching opening, into a locking position in which it engages at least one of said latching openings, by means of a force acting downwards on said fitting part relative to said rail, said latching part being configured as a latching plate provided with a latching projection, said latching plate being swivable from said rest position into said locking position about a tilt edge oriented perpendicular to said side parts, said fitting part being a fastener stud provided directly on said latching plate and arranged substantially perpendicular to said planar bottom part of said rail, said latching openings being arranged in said bottom part of said rail.

10. The adjuster device of claim 9, wherein said tilt edge is defined by a projection provided on said sled, said latching plate resting against said projection.

* * * * *